(12) United States Patent (10) Patent No.: US 12,578,219 B2
Dietmann (45) Date of Patent: Mar. 17, 2026

(54) RETAIL WEIGHING SCALE

(71) Applicant: Bizerba SE & Co. KG, Balingen (DE)

(72) Inventor: Bernhard Dietmann, Grosselfingen (DE)

(73) Assignee: BIZERBA SE & CO. KG, Balingen (DE)

( * ) Notice: Subject to any disclaimer, the term of this patent is extended or adjusted under 35 U.S.C. 154(b) by 362 days.

(21) Appl. No.: 18/323,054

(22) Filed: May 24, 2023

(65) Prior Publication Data

US 2023/0392977 A1 Dec. 7, 2023

(30) Foreign Application Priority Data

Jun. 1, 2022 (EP) ..................................... 22176873

(51) Int. Cl.
*G01G 19/414* (2006.01)
*G01G 3/14* (2006.01)
*G01G 21/28* (2006.01)
*G01V 8/12* (2006.01)

(52) U.S. Cl.
CPC ........... *G01G 19/4144* (2013.01); *G01G 3/14* (2013.01); *G01G 21/28* (2013.01); *G01V 8/12* (2013.01)

(58) Field of Classification Search
CPC ...... G01G 19/4144; G01G 3/14; G01G 21/28; G01G 23/017; G01V 8/12
USPC ....................................................... 177/180
See application file for complete search history.

(56) References Cited

U.S. PATENT DOCUMENTS

| | | | | |
|---|---|---|---|---|
| 7,194,922 B2 * | 3/2007 | Bucher | .................... | G01G 3/18 |
| | | | | 73/862.623 |
| 9,766,113 B2 * | 9/2017 | Trakhimovich | ..... | G01G 3/1412 |
| 10,788,381 B2 * | 9/2020 | Lang | .................... | F16J 15/3296 |
| 10,830,633 B2 * | 11/2020 | Fiehn | .................... | G01G 23/01 |
| 10,837,820 B2 * | 11/2020 | Schreiber | ................ | G01L 1/225 |
| 11,815,390 B2 * | 11/2023 | Barkan | ................ | G06Q 20/208 |
| 2002/0104690 A1 * | 8/2002 | Schurr | ................. | G01G 3/1412 |
| | | | | 177/229 |
| 2003/0168260 A1 * | 9/2003 | Muyal | ................ | G01G 19/4144 |
| | | | | 177/25.15 |

(Continued)

FOREIGN PATENT DOCUMENTS

| | | |
|---|---|---|
| CN | 206920004 U | 1/2018 |
| CN | 113465718 A | 10/2021 |
| EP | 3370044 B1 | 12/2019 |

*Primary Examiner* — Jacques M Saint Surin
(74) *Attorney, Agent, or Firm* — LEYDIG, VOIT & MAYER, LTD.

(57) ABSTRACT

A weighing scale includes a weighing module having a load cell in a housing. The load cell has fixed, deformation, and movable portions. The fixed portion is connected to the housing, and the movable portion bears a spider bearing a platter. The housing is open upward in a region of the load cell. The housing is closed by the platter and by edges of the platter which protrude downward beyond the top edge of the housing. The deformation portion has a strain gauge for measuring a weight acting on the platter. A printed circuit board includes electronics for processing a signal from the strain gauge. The electronics include memory storing calibration-data of the load cell. A removable cover is fastened to the fixed portion by a first fastener secured by a calibration mark, and protects the memory of the printed circuit board against manipulation of calibration data.

14 Claims, 5 Drawing Sheets

(56)                    References Cited

U.S. PATENT DOCUMENTS

2023/0213374 A1 *   7/2023   Buhl  .................... G01G 21/283
177/177

* cited by examiner

RETAIL WEIGHING SCALE

CROSS REFERENCE TO RELATED APPLICATIONS

This application claims benefit to European Patent Application No. EP 22176873.2, filed on Jun. 1, 2022, which is hereby incorporated by reference herein.

FIELD

The present disclosure relates to a weighing scale, in particular to a retail weighing scale, comprising a weighing module.

BACKGROUND

Weighing scales are well known to a person skilled in the art. These weighing scales are subject to the Weights and Measures Act (Eichgesetz). In other words, their accuracy is guaranteed by compliance with calibration regulations. In this respect, calibration-relevant data have to be stored in a memory of the weighing scale in a manipulation-proof manner. Manipulation of these data should only be possible if, in doing so, a calibration seal, i.e., a calibration mark, is breached and this can be verified by a simple verification, for example by opening the weighing scale housing by removing a platter. Any modification to the weighing scale that might lead to a calibration-relevant change in the characteristics of the weighing scale has to be traceable using one or possibly more calibration marks. This also covers load cell replacements.

A load cell comprising protection for the calibration-relevant electronics is known, for example, from EP3370044B1.

SUMMARY

In an embodiment, the present disclosure provides a weighing scale that includes a weighing module, which has a housing in which a load cell is housed. The load cell has a fixed portion, a deformation portion, and a movable portion. The fixed portion is connected to the housing, and the movable portion bears a spider. The housing is open upward in a region of the load cell. The spider bears a platter. The housing is closed by the platter and by edges of the platter which protrude downward beyond the top edge of the housing. The deformation portion has at least one strain gauge for measuring a weight acting on the platter. The weighing module further includes a printed circuit board, which includes electronics for processing a signal from the at least one strain gauge being attached to the fixed portion of the load cell. The electronics include a memory in which calibration-relevant data of the load cell or a value for an acceleration due to gravity are stored. The weighing module further includes a first removable cover that is fastened to the fixed portion of the load cell by a first fastener that is secured by a calibration mark, and protects the memory of the printed circuit board against manipulation of calibration-relevant data.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
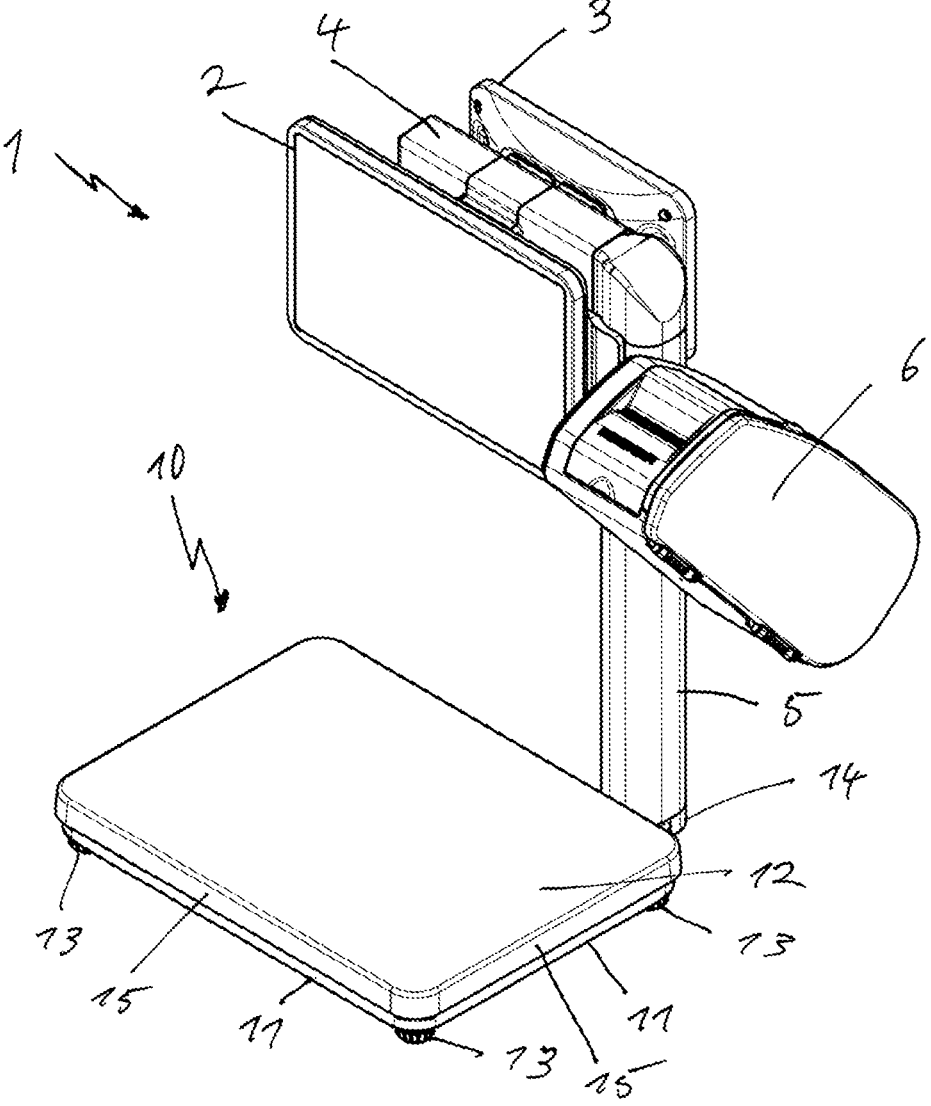
FIG. 1 shows a retail weighing scale according to an aspect of the relevant disclosure.

In an embodiment, the present disclosure provides a retail weighing scale in which it is simple to verify that no calibration-relevant modifications have been made to the weighing scale.

According to an aspect of the present disclosure, a weighing scale, in particular a retail weighing scale, comprising a weighing module is provided. The weighing module comprises a housing in which a load cell is housed. The load cell comprises a fixed portion, a deformation portion, and a movable portion. The fixed portion is connected to the housing. In one embodiment, the fixed portion is screwed to the housing. In one embodiment, the fixed portion is screwed to the housing using two or four screws. The movable portion bears a spider. The housing is open upward in the region of the load cell. The spider bears a platter. The housing is closed by the platter and by the edges of the platter which protrude downward beyond the top edge of the housing. The deformation portion of the load cell has at least one strain gauge for measuring a weight acting on the platter. A printed circuit board comprising electronics for processing the signal from the at least one strain gauge is attached to the fixed portion of the load cell. The electronics comprise a memory, in which calibration-relevant data, in particular calibration data, of the load cell and/or a value for the acceleration due to gravity are stored. These are data that have to be manipulation-proofed under the Weights and Measures Act. If the data are modified, the calibration mark has to be destroyed so as to make the modification visible. In other words, pursuant to the Weights and Measures Act these data should not be able to be modified without unavoidably destroying the calibration mark in the process. The weighing scale comprises a first removable cover, which is fastened to the fixed portion of the load cell by means of a first fastening element. In one embodiment, the first fastening element is a first fastening screw. In this case, the first fastening element, in particular the first fastening screw, is secured by a calibration mark. The first removable cover protects the memory of the printed circuit board against manipulation of calibration-relevant data. In one embodiment, the first removable cover covers a hardware interface that is suitable for modifying the calibration-relevant data.

In one embodiment, the load cell is fastened, by its fixed portion, to the housing of the weighing module using at least one second fastening element. In one embodiment, the load cell is fastened, by its fixed portion, to the housing of the weighing module using at least one second fastening screw.

In one embodiment, the load cell is fastened, by its fixed portion, to the housing of the weighing module using two second fastening screws. In one embodiment, the load cell is fastened, by its fixed portion, to the housing of the weighing module using four second fastening screws. The at least one second fastening element, in particular the at least one second fastening screw, is covered by a second removable cover. The at least one second fastening element, in particular the at least one second fastening screw, is accessible from outside the housing and can be released if the second removable cover is removed. If the second removable cover is removed, the at least one second fastening element is accessible on the outside of the housing of the weighing module and can be released. If the at least one second fastening element is at least one second fastening screw, the screw head(s) is/are accessible and releasable from outside the housing of the weighing module once the second cover has been removed.

In one embodiment, the second removable cover is fastened to the housing of the weighing module or to the fixed portion of the load cell by a third fastening element inside the housing. In one embodiment, the third fastening element is a third fastening screw.

In one embodiment, the first removable cover covers the third fastening element, in particular the third fastening screw, in such a way that the third fastening element, in particular the third fastening screw, cannot be released unless the first removable cover is removed. The third fastening element can only be released once the first removable cover has been removed.

In one embodiment, the at least one second fastening element, in particular the at least one second fastening screw, is attached on an underside of the housing of the weighing module in a recess and enters the housing of the weighing module through a through-opening. The second removable cover is attached in the recess when it is fastened to the housing of the weighing module or to the fixed portion of the load cell by the third fastening element.

In one embodiment, the second removable cover consists of a planar plate to which an elongate, in particular cylindrical, retaining element is attached. In an assembled state, the elongate, in particular cylindrical, retaining element of the second removable cover is attached in a tubular opening in the housing of the weighing module. The elongate, in particular cylindrical, retaining element is fixed in place at the tubular opening by the third fastening screw.

In one embodiment, the third fastening screw is longitudinally screwed into the cylindrical retaining element of the second removable cover. In other words, the axis of the third fastening screw and the axis of the cylindrical retaining element extend in parallel and in particular coincide. The screw head of the third fastening screw has a greater diameter than the diameter of the tubular opening in the housing of the weighing module. The screw head prevents the cylindrical retaining element from being pulled out of the tubular opening.

In one embodiment, the fixed portion has a recess on top, into which the printed circuit board is horizontally inserted. The recess is open toward the end of the fixed portion, i.e., toward the load cell end that absorbs the force. The first removable cover is placed onto the recess of the fixed portion from above and covers the recess and the printed circuit board at least in part. In particular, the first removable cover covers the recess and the printed circuit board in such a way that the electronics for processing the signal from the at least one strain gauge and/or the memory containing calibration-relevant data, and optionally a hardware interface for accessing the memory, are accessible only once the first removable cover has been removed.

In one embodiment, the first removable cover is in the form of a plate-like structure that is mounted on the fixed portion of the load cell at least in part. The first removable cover has an extension that covers the top of the third fastening element, in particular the screw head of the third fastening screw. In one embodiment, the screw head of the third fastening screw is arranged next to the fixed portion of the load cell such that the extension protrudes beyond the main body of the first removable cover and, in particular, owing to a Z-shaped formation, the extension is arranged so as to be vertically offset from the plate-like structure and at a height close to the top face of the screw head of the third fastening screw.

In one embodiment, the at least one second fastening element, in particular the at least one second fastening screw, is not secured by a separate calibration mark. In one embodiment, the third fastening element, in particular the third fastening screw, is not secured by a separate calibration mark.

In one embodiment, a hardware interface is provided on the printed circuit board, via which hardware interface the memory can be accessed and the calibration data stored in the memory and/or the value for the acceleration due to gravity can be modified. An electronic write protection is provided for the memory. The electronics comprise a switching device for deactivating the write protection of the memory. The switching device can be operated only once the first fastening element, in particular the first fastening screw, has been withdrawn and/or once the first removable cover has been removed. The write protection can be deactivated in this way.

In one embodiment, the switching device is a sensor that is configured to detect that the first fastening element has been removed from its fastened position, in particular to detect that the first fastening screw has been unscrewed, and configured to output a switching signal for deactivating the write protection of the memory once removal of the first fastening element has been detected. In one embodiment, the calibration mark is unavoidably breached when the first fastening element is removed. In other words, when the first fastening element is removed, the write access to the memory is enabled by the write protection of the memory being deactivated. Thus, the instrument is no longer calibrated since it is no longer traceable whether or not the data in the memory have been modified and whether the load cell still complies with the requirements of the Weights and Measures Act as a result of modifications. The unavoidable breach of the calibration mark when the first fastening element is removed, which is essential for deactivating the write protection of the memory, makes it obvious that the instrument is in an uncalibrated state. In one embodiment, it is absolutely necessary to remove the first fastening element in order to output a switching signal for deactivating the write protection of the memory.

In one embodiment, the sensor is a photoelectric sensor which has a transmitter and a receiver, is arranged such that the beam path between the transmitter and the receiver is interrupted when the first fastening element is in its fastened position, and is configured to output a switching signal for deactivating the write protection of the memory when the beam path between the transmitter and the receiver is no longer interrupted by the first fastening element.

In one embodiment, the spider has a cut-out through which the calibration mark is visible once the housing of the weighing module has been opened by removing the platter from the spider.

In one embodiment, the calibration mark and the first fastening element are accessible and removable through the cut-out in the spider. In one embodiment, once the calibration mark has been removed, the first fastening element can be removed through the cut-out in the spider, but without the first removable cover being able to be removed through the cut-out in the spider in the process. This still has the advantage whereby the write access to the memory is thus enabled and this is documented by the breach of the calibration mark.

FIG. 1 shows a retail weighing scale 1 according to an aspect of the present disclosure. The retail weighing scale 1 comprises a weighing module 10. The weighing module 10 comprises a housing 11, which is produced, for example, from a cast alloy. A load cell that bears a platter 12 by way of a spider is housed in the housing 11. The platter 12 consists of a sheet metal part having edges 15 that protrude downward and beyond the top edge of the housing 11. The upwardly open housing 11 of the weighing module 10 is closed by the platter 12 placed on the spider. The platter 12 thus protects the housing interior of the weighing module 10 and the load cell located therein against dirt and environmental influences. The weight of an object mounted on the platter 12 is determined by means of the load cell. The weighing module 10 is supported on a tabletop or counter by means of adjustable feet 13. A stand 5 is attached to the weighing module 10 by means of a mount 14. The stand bears an operator display 2 facing an operator, the operator display being in the form of a touchscreen and allowing the operator to interact with the retail weighing scale 1. In addition, the stand bears a customer display 3, which, in the case of serviced sales, faces a customer and gives them various pieces of information, for example a weight or price of an item placed on the scales, the name of the item, and other ancillary information or promotional information. Optionally, the customer display 3 is also in the form of a touchscreen such that the customer can also interact with the retail weighing scale 1, for example can log in with a customer account in order to collect points for their current purchase. In addition, there is a printer 6 on the stand 5, preferably a direct thermal printer, for printing out receipts for serviced sales. Between the operator display 2 and the customer display 3 there is a CPU unit 4 comprising the electronics for processing data and for actuating the printer 6. In the housing 11 of the weighing module 10 there is a power supply module that ensures the printer 6, CPU unit 4, and the displays 2, 3 are supplied with power. The electrical connections between the individual components, such as the power supply module, printer 6, CPU unit 4, and the displays 2, 3, are provided by cable connections, the cables being led into the stand 5 from the housing 11 of the weighing module 10 via the mount 14. In the process, the cables run inside the mount 14 and inside the stand 5 and, via openings in the stand, directly into openings in the printer 6 and the CPU unit 4, such that the cables are not visible from the exterior. The cables thus do not interfere with the appearance of the retail weighing scale 1. The cables are in the form of standard cables, preferably USB-C cables, so cost-effective modules available on the market can be used in the production of the retail weighing scale 1. This also means, for example, that the customer display 3 and the operator display 2, the power supply module, and other components can be standard modules available on the market that are interconnected using USB-C cables. The load cell and its electronics, the electronics in the CPU unit 4, and the printer 6 are modules developed and adapted specifically for the weighing scale. This combination of standard modules 2, 3, where available, and custom modules 4, 6 allows the retail weighing scale 1 to be produced cost-effectively. Likewise, high flexibility and modularity is possible, for example by replacing the operator display 2 or the customer display 3 with displays of different sizes. Preferably, all the modules support plug-and-play functions via the USB-C interfaces. A person skilled in the art understands that the USB-C interface is stated by way of example, but any other universal interface that is available currently or in future is possible for producing standardized cable connections between the individual modules.

Figure 2:
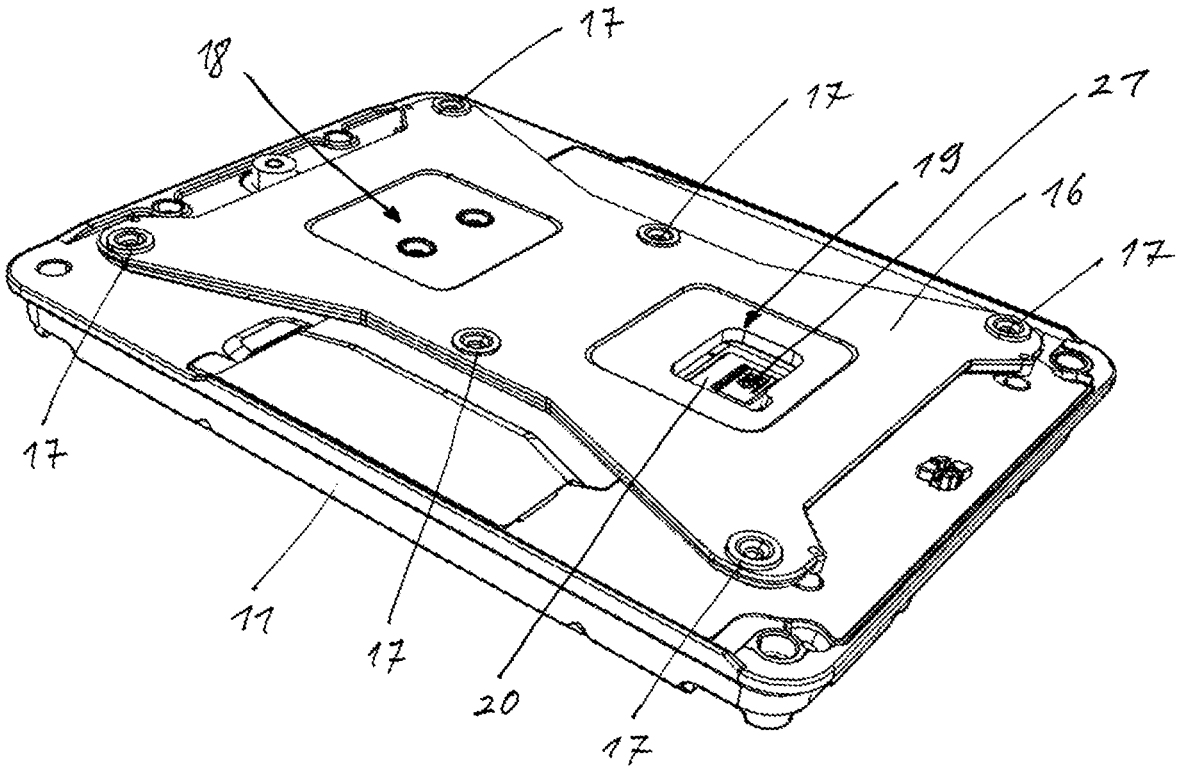
FIG. 2 shows a weighing module of a retail weighing scale according an aspect of the present disclosure.

FIG. 2 is an isometric view of the weighing module 10 with the platter 12 removed. The housing 11 of the weighing module is open upwards, the spider 16 being screwed onto the movable portion of the load cell by means of a fastening device 18. In this view, the load cell in the open region of the housing 11 is covered by the spider 16. By means of the movable portion of the load cell, the spider 16 is retained in a floating manner and so as to be movable toward the housing 11. In particular, the spider 16 moves toward the housing 11 of the weighing module 10 when a weight force is applied to the spider 16 and causes the deformation portion of the load cell to be deformed. In this case, the spider 16 should not contact the housing 11 of the weighing module 10 at any point so that no force shunt effect occurs between the movable portion and the fixed portion of the load cell. This would cause the weighing result to be distorted. The spider 16 comprises six supporting points 17 that bear the platter 12. The supporting points 17 are formed from rubber recesses in which the platter 12 can, by way of precisely fitting metal bolts attached to the underside, be mounted on the supporting points 17 such that the platter 12 has stable support on the spider 16 when the housing 11 is closed by the platter 12. The platter 12 can be removed by being moved upward off the spider 16 in order to open the weighing module 10. In the region of the fixed portion of the load cell, the spider 16 comprises a cut-out 19 through which the load cell therebelow can be seen. In the region of the cut-out 19, on the fixed portion of the load cell, there is a printed circuit board comprising electronics for processing the signal from at least one strain gauge of the load cell. The electronics are covered by a first removable cover 20. The first removable cover is fastened to the fixed portion of the load cell by a first fastening element (fastener). The first fastening element of the first removable cover 20 is protected by a calibration mark 21 that is visible through the cut-out 19 in the spider 16 once the housing 11 of the weighing module 10 has been opened by removing the platter 12 from the spider 16.

Figure 3:
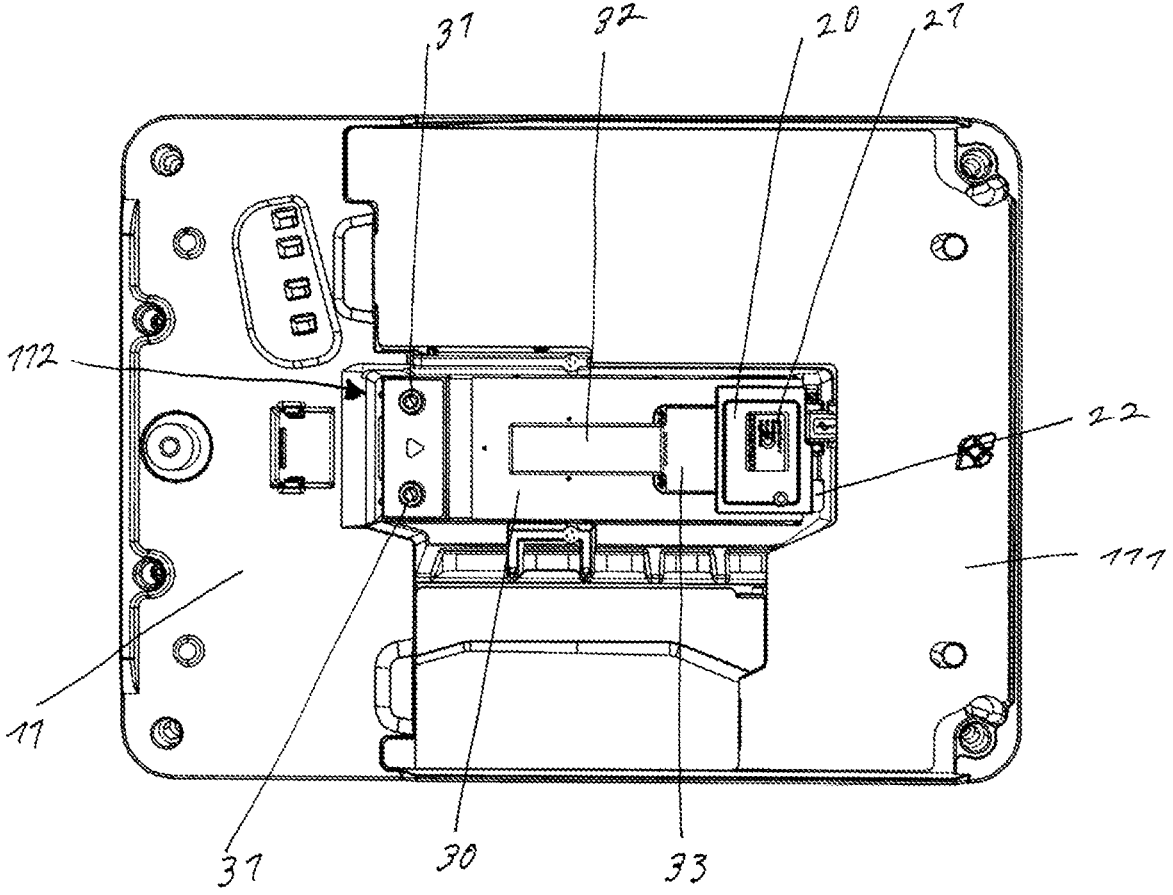
FIG. 3 shows the weighing module of a retail weighing scale according to an aspect of the present disclosure, without a spider.
Figure 4:
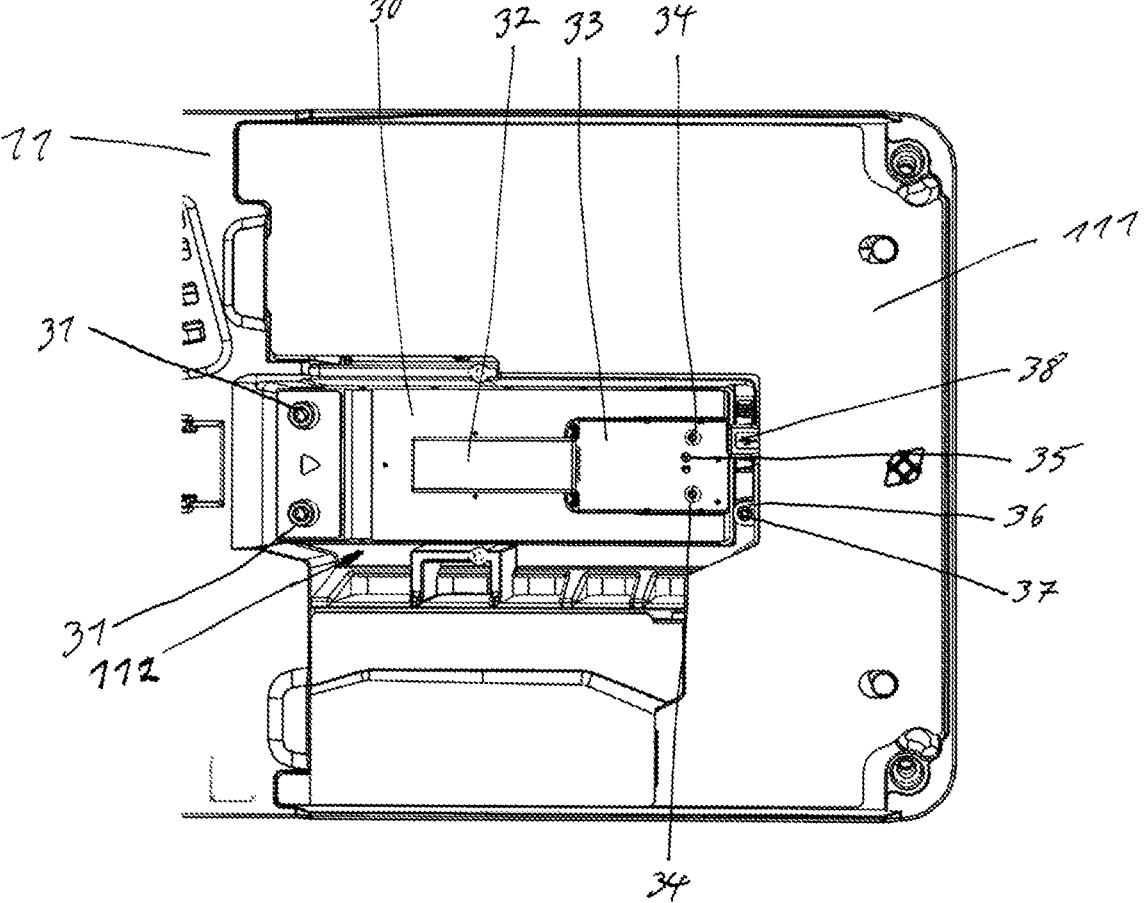
FIG. 4 shows the weighing module of a retail weighing scale according to an aspect of the present disclosure, without a spider and without a removable cover.

FIGS. 3 and 4 are plan views of the weighing module 10. For the sake of clarity, the spider is not shown in these figures. In standard operation, the spider is screwed down by means of the fastening device 18 using screws 31, so it is not intended that the spider 16 is removed as shown in FIGS. 3 and 4. FIG. 3 shows the load cell 30 in an open region 112 of the housing 11 of the weighing module 10, the load cell comprising screws 31 on its movable portion for supporting the spider. The weight to be weighed is introduced into the load cell 30 at the movable portion. The load cell 30 comprises a deformation portion to which at least one strain gauge 32 is attached. The load cell 30 is screwed, by its fixed portion, to the housing 11 of the weighing module 10. A printed circuit board 33 is attached to the fixed portion in a recess. The printed circuit board 33 comprises electronics for processing the signal from the at least one strain gauge. The electronics comprise a memory in which calibration-relevant data, in particular calibration data of the load cell, and/or a value for the acceleration due to gravity are stored. The printed circuit board 33 is covered by a first removable cover 20, as shown in FIG. 3. The first removable cover 20 is fastened to the fixed portion of the load cell 30 by a first fastening screw. The first fastening screw is covered by a calibration mark 21. The first removable cover 20 has an extension 22 that covers the top of a screw head of a third fastening screw. The housing 11 comprises a separate installation space arranged in a U shape around the load cell 30 and in which various modules, for example a power supply module and connection cables, are housed. This installation space is covered by a cover plate 111, even when the weighing module 10 is open upward owing to the platter 12 having been removed. The open region 112 of the housing in which the load cell 30 is located is not covered by the cover plate 111. The housing 11 of the weighing module 10 is not closed by the cover plate 111. FIG. 4 shows the weighing module 10 with the first removable cover removed. The printed circuit board 33 is fully visible in this view. The printed circuit board is screwed to the fixed portion of the load cell 30 using two screws 34. The printed circuit board 33 is contacted with a cable using a USB plug 38 and relays the weighing results to the CPU unit 4 of the retail weighing scale 1 via the cable. The printed circuit board 33 has a hole 35 through which the first fastening screw protrudes when the first removable cover 20 is fastened to the fixed part of the load cell using the first fastening screw.

At its longitudinal end located at the end of the fixed portion of the load cell 30, the printed circuit board 33 has at least one hardware interface electrically connected to the electronics. Using the hardware interface, the load cell 30 can be adjusted during production of the load cell 30 or during a calibration process by a calibration official. In the process, calibration data of the load cell 30 are in particular stored in a calibratable memory of the electronics, an electronic write protection then being activated to prevent unauthorized manipulation of the calibration data later on. The hardware interface is covered by the first removable cover.

In addition to the hardware interface, an additional hardware interface is provided, which is a USB interface by means of which the weight value calculated by the electronics can be read out by the CPU unit 4 or output thereto.

The presence of the first fastening screw 40 can be recognized by a photoelectric sensor that is attached to the underside of the printed circuit board 32 and covered by the first removable cover 20 so as to be inaccessible from the exterior. For this purpose, the transmitter and the receiver of the photoelectric sensor are arranged on two opposite sides of the hole 35 formed in the printed circuit board 33, such that the photoelectric sensor is interrupted by the first fastening screw 40 being screwed in. The photoelectric sensor is configured such that a switching signal is generated when the photoelectric sensor is no longer interrupted by the fastening screw 40, i.e., when the fastening screw 40 is unscrewed. The switching signal of the photoelectric sensor is used to clear the above-described electronic write protection of the memory containing the calibration data of the load cell 30, as is required in order for the load cell 30 to be permissibly recalibrated.

FIG. 4 shows the screw head of the third fastening screw 37 next to the fixed portion of the load cell 30. The third fastening screw 37 is fastened in a retaining element of a second removable cover, the retaining element of the second removable cover being located in a tubular opening in the housing 11 of the weighing module 10 and being fixed in place at the top end 36 of the tubular opening 46 by the third fastening screw 37.

Figure 5:
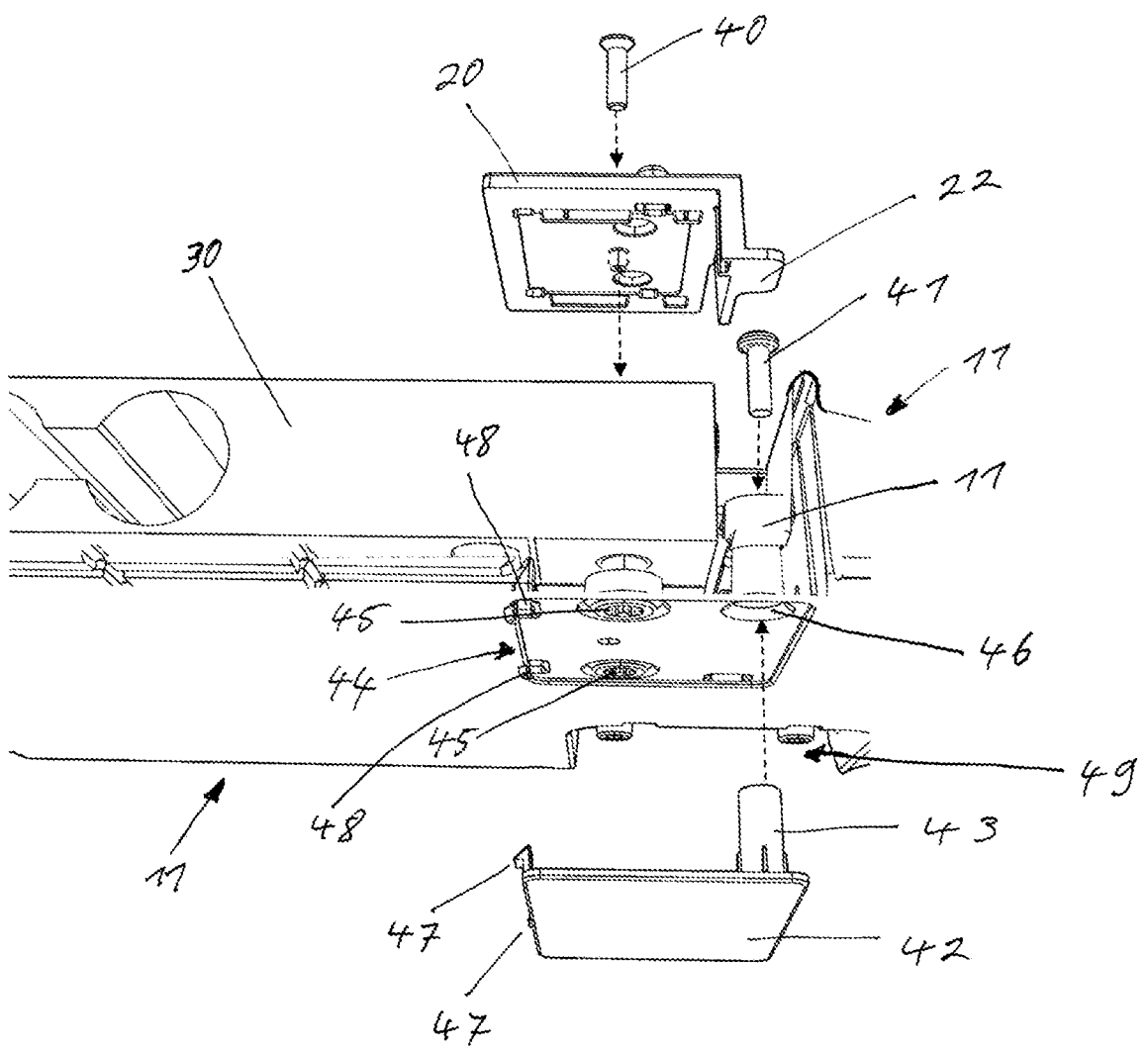
FIG. 5 is a sectional drawing of the weighing module of a retail weighing scale according to an aspect of the present disclosure.

FIG. 5 is an exploded view of a sectional drawing through the weighing module 10. This figure shows how the load cell 30 is screwed, by its fixed portion, to the housing 11 of the weighing module from below using two screws 45. In this case, the screws 45 extend inward from below, from outside the housing 11, through an opening in the housing 11 and are screwed in the fixed portion of the load cell 30. The screw heads of the screws 45 are accessible outside the housing 11. To prevent this accessibility, in the region of the screws 45 on the housing, a recess 44 is provided, into which a second removable cover 42 can be inserted. The second removable cover 42 is fastened in the recess 44 by a latching mechanism 47, 48. The second removable cover 42 consists of a planar plate and a cylindrical retaining element (retainer) 43, which, in an assembled state, is attached in a tubular opening 46 in the housing 11 of the weighing module 10. At the inner end 36 of the tubular opening 46, the end of the cylindrical retaining element 43 terminates flush with the tubular opening when the second removable cover 42 is attached in the recess 44. A third fastening screw 41 is longitudinally screwed into the cylindrical retaining element 43 from above. The screw head of the third fastening screw 41 is present at the inner end 36 of the tubular opening and secures the second removable cover 42 in the intended position. Thus, the screws 45 retaining the fixed portion of the load cell 30 on the housing 11 can be unscrewed only when the third fastening screw 41 in the interior of the housing 11 is removed. If, however, the first removable cover 20 is installed on the fixed portion of the load cell 30, the extension 22 of the first removable cover 20 covers the screw head of the third fastening screw 41 and prevents it from being removed. Since the first removable cover 20 is fastened to the fixed portion of the load cell 30 using the first fastening screw 40 and is secured by the calibration mark 21, the third fastening screw 41 likewise cannot be released without destroying the calibration mark 21. Thus, using one calibration mark 21, both the screw connection 45 of the load cell 30 and the printed circuit board 33, together with its electronics, can be secured.

In a calibrated weighing scale, it has to be ensured that the screw connection of the load cell 30 has not been released. For this reason, the screw connection also has to be secured by a calibration mark. Since in the prior art the screw connection of the load cell is often implemented from above and inside the housing, the screw connection comprising the calibration mark and a corresponding cover can be implemented in a relatively simple manner. When the load cell is screw-connected from the exterior, as implemented in the retail weighing scale according to an aspect of the present disclosure, a cover is needed for the screw connection, which has to be secured by a separate calibration mark. However, a calibration mark attached underneath the weighing scale and on the outside of the housing for securing the cover of the screws underneath the weighing scale can easily be damaged and thus lead to problems. This problem is overcome by the disclosed design for securing the second removable cover from inside.

The functions of various elements shown in the drawings, including the functional blocks, may be implemented by dedicated hardware or by generic hardware capable of executing software in conjunction with the corresponding software. If the functions are provided by means of a processor, they may be provided by a single dedicated processor, a single shared processor, or a plurality of generic processors which may in turn be shared. The functions may be provided, without limitation, by a digital signal processor (DSP), network processor, application-specific integrated circuit (ASIC), field programmable gate array (FPGA), read-only memory (ROM) with stored software, random access memory (RAM), and non-volatile memories.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A weighing scale, the weighing scale comprising a weighing module, the weighing module comprising:
   a housing in which a load cell is housed, the load cell comprising a fixed portion, a deformation portion, and a movable portion, the fixed portion being connected to the housing, and the movable portion bearing a spider, the housing being open upward in a region of the load cell, the spider bearing a platter, the housing being closed by the platter and by edges of the platter which protrude downward beyond the top edge of the housing, the deformation portion comprising at least one strain gauge for measuring a weight acting on the platter;
   a printed circuit board, which comprises electronics for processing a signal from the at least one strain gauge being attached to the fixed portion of the load cell, the electronics comprising a memory in which calibration-relevant data of the load cell or a value for an acceleration due to gravity are stored; and
   a first removable cover that is fastened to the fixed portion of the load cell by a first fastener that is secured by a calibration mark, and protects the memory of the printed circuit board against manipulation of calibration-relevant data, wherein:
   the load cell is fastened, by its fixed portion, to the housing of the weighing module using at least one second fastener,
   the at least one second fastener is covered by a second removable cover, and
   the at least one second fastener is configured to be accessible from outside the housing and able to be released only in a state where the second removable cover is removed.

2. The weighing scale according to claim 1, wherein the second removable cover is fastened to the housing of the weighing module or to the fixed portion of the load cell by a third fastener inside the housing.

3. The weighing scale, according to claim 2, wherein the first removable cover covers the third fastener in such a way that the third fastener cannot be released unless the first removable cover is removed.

4. The weighing scale according to claim 2, wherein, on an underside of the housing of the weighing module, the at least one second fastener enters the housing of the weighing module through a through-opening and is attached in a recess of the housing of the weighing module, the second removable cover being attached in the recess when the cover is fastened to the housing of the weighing module or to the fixed portion of the load cell by the third fastener.

5. The weighing scale, according to claim 2, wherein the second removable cover consists of a planar plate to which an elongate retainer is attached, the elongate retainer of the second removable cover, in an assembled state, being attached in a tubular opening in the housing of the weighing module and being fixed in place in the tubular opening by the third fastening element.

6. The weighing scale, according to claim 5, wherein the third fastener is longitudinally screwed into the cylindrical retainer of the second removable cover, and a screw head of the third fastener has a greater diameter than the diameter of the tubular opening in the housing of the weighing module, and the screw head prevents the cylindrical retainer from being pulled out of the tubular opening.

7. The weighing scale according to claim 2, wherein the first removable cover is in the form of a plate-like structure which is mounted on the fixed portion of the load cell at least in part and has an extension that covers the top of the third fastener.

8. The weighing scale according to claim 2, wherein the at least one second fastener or the third fastener are not secured by a separate calibration mark.

9. The weighing scale according to claim 1,
   wherein the fixed portion has a recess on top, into which the printed circuit board is horizontally inserted, and
   wherein the recess is open toward the fixed portion of the load cell, and
   wherein the first removable cover is configured to be placed onto the recess of the fixed portion from above and configured to cover the recess and the printed circuit board at least in part such that the electronics for processing the signal from the at least one strain gauge or the memory containing the calibration-relevant data are accessible only once the first removable cover has been removed.

10. The weighing scale, according to claim 1, wherein a hardware interface is provided on the printed circuit board, via which hardware interface the memory is accessible and the calibration data stored in the memory or the value for the acceleration due to gravity is modifiable, and an electronic write protection being provided for the memory, the electronics comprising a switching device for deactivating the write protection of the memory, and the switching device being able to be operated, and the write protection being able to be deactivated, only once the first fastener has been withdrawn and/or once the first removable cover has been removed.

11. The weighing scale, according to claim 10, wherein the switching device is a sensor that is configured to detect that the first fastener has been removed from its fastened position, and configured to output a switching signal for deactivating the write protection of the memory once removal of the first fastener has been detected.

12. The weighing scale, according to claim 11, wherein the sensor is a photoelectric sensor which has a transmitter and a receiver, is arranged such that the beam path between the transmitter and the receiver is interrupted when the first fastener is in its fastened position, and is configured to output a switching signal for deactivating the write protection of the memory when the beam path between the transmitter and the receiver is no longer interrupted by the first fastener.

13. The weighing scale, according to claim 1, wherein the spider has a cut-out through which the calibration mark is configured to be visible once the housing of the weighing module has been opened by removing the platter from the spider.

14. The weighing scale, according to claim 13, wherein the calibration mark and the first fastener are accessible and removeable through the cut-out in the spider.

\* \* \* \* \*